United States Patent

Endo et al.

[11] Patent Number: 5,961,884
[45] Date of Patent: Oct. 5, 1999

[54] BLUE OR BLUISH GREEN ALUMINUM SILICATE LUMINOUS STORAGE MATERIAL AND ITS MANUFACTURING METHOD

[75] Inventors: Tadashi Endo, Iwanuma; Pingfan Mo, Sendai, both of Japan

[73] Assignee: Read Co., Ltd., Kanagawa, Japan

[21] Appl. No.: 09/132,090

[22] Filed: Aug. 10, 1998

[30] Foreign Application Priority Data

Aug. 20, 1997 [JP] Japan ................................. 9-238966

[51] Int. Cl.$^6$ .................................................. C09K 11/64
[52] U.S. Cl. .............................. 252/301.4 F; 252/301.6 F
[58] Field of Search ...................... 252/301.4 F, 301.6 F

[56] References Cited

U.S. PATENT DOCUMENTS 3,577,169  5/1971  Barry ................................ 252/301.4 F
3,897,359  7/1975  Kobayashi et al. ............... 252/301.4 F Primary Examiner—C. Melissa Koslow
Attorney, Agent, or Firm—Oblon, Spivak, McClelland, Maier & Neustadt, P.C.

[57] ABSTRACT

The present invention provides a luminous storage material that emits a blue or bluish green light, that has high persistence, that is thermally and structurally stable, and that exhibits a high weather resistance in chemically severe conditions. The present invention also provides manufacturing method for this material. A blue aluminum silicate luminous storage material according to this invention is composed of a powdered product that has been activated by $Eu^{2+}$ wherein its composition formula is expressed as follows:

$$(M_{l-n-m}M^*_n\text{-}Eu_m)(Al_{1-x}Si_{3/4}x\square_{1/4x})_2O_4$$

(wherein $\square$ is vacancy; M is one or more types of alkali earth metal elements selected from a group of magnesium, calcium, strontium, and barium; M* is one or more types of bivalent metal elements selected from a group of manganese, zinc, and cadmium; and (n), (m), and (x) consist of numerical values meeting the ranges $0 \leq n \leq 0.2$, $0 < x < 0.6$, $0.0001 \leq m \leq 0.1$).

11 Claims, 9 Drawing Sheets

BLUE OR BLUISH GREEN ALUMINUM SILICATE LUMINOUS STORAGE MATERIAL AND ITS MANUFACTURING METHOD

FIELD OF THE INVENTION

The present invention relates to a blue or bluish green aluminum silicate luminous storage material and its manufacturing method. Specifically, the present invention relates to an aluminum silicate luminous storage material. The material comprises an emitter that emits a blue or bluish green light indoors, outdoors, underwater, or in other dark places when excited by electron beams, ultraviolet rays, and/or visible radiation. The material also has a long-lasting blue afterglow after excitation is stopped. The luminous storage material is mainly activated by $Eu^{2+}$, is thermally stable, and exhibits excellent chemical stability in an oxidizing or reducing atmosphere. The present invention also relates to a manufacturing method for this material.

PRIOR ART

Phosphor emits light when excited by certain external stimuli such as grain energy, electrons, or light. A persistent luminous material that can maintain emission after excitation is stopped is called a luminous storage material. Due to the needs for various types of displays and advanced functions for dark places, there is a demand for luminous storage that can handle multiple colors and maintain emissions over a long period of time. In addition, greater weather resistance is also now needed.

In conventional luminous storage material, a very small number of materials are available, the number of colors of light and afterglow are limited, the afterglow time is short, and weather resistance is insufficient. Inorganic materials include sulfide or oxyacid-salt (such as strontiumaluminate) luminous material due to their storage capability. Sulfide phosphors include, for example, (Ca, Sr) S:$Bi^{3+}$ phosphors emitting a blue light, ZnS:$Cu^{2+}$ phosphors emitting a yellowish green light; and (Zn, Cd) S:Cu phosphors emitting a red light. Oxyacid salt phosphors include, for example, alkali earth metal aluminate which has been activated by europium and which is expressed by the chemical formula $MAl_2O_4$. In this case, M is alkali earth metal of magnesium, calcium, or strontium. In particular, an $SrAl_2O_4$:$Eu^{2+}$ phosphor having a stuffed tridymite structure and reported in Journal of Electrochemical Society, Vol. 118, pp. 930 (1971) is known to have relatively high persistence. These phosphors, however, are not good enough luminous storage or have poor weather resistance.

In fact, since the host of (Ca, Sr) S:$Bi^{3+}$ phosphor has inadequate chemical stability and also has insufficient luminance and afterglow time as an emitter, it is now rarely used. In addition, (Zn, Cd) S:Cu phosphor contains Cd, which is toxic, and its luminance level and afterglow time are impractical, so it is now rarely used. ZnS:$Cu^{2+}$ phosphor is likely to be photodissociated and melanized by ultraviolet rays in the presence of humidity, and has an insufficient afterglow time, but due to its low price, it is now frequently used outdoors for clockfaces and evacuation guidance signs.

Strontiumaluminate/bariumaluminate that has been mainly activated by europium is a yellowish green emitter having a maximum luminescent intensity near 520 nm/500 nm. It takes 2,000 minutes or more for it to drop to 0.32 $mcd/m^2$, indicating higher persistence than ZnS:Cu phosphor, which drops to this level in 200 minutes. It has been suggested, however, that this material does not meet requirements for weather resistance and multiple colors.

SUMMARY OF THE INVENTION

It is a basic object of this invention to eliminate the above disadvantages of the conventional inorganic luminous storage materials to provide luminous storage that emits a blue or bluish green light, that has high persistence, that is thermally and structurally stable, and that exhibits high weather resistance under chemically severe conditions. A further object of this invention is to specify a manufacturing method for such a material.

To achieve this object, the inventors have investigated luminous material having new compositions by focusing on oxides containing elements in group II of the periodic table and aluminum silicate compounds to find that a new aluminum-silicate compound luminous storage material can be obtained by using $Eu^{2+}$ or $Eu^{2+}$ and an Ln rare earth element to activate a reactive product of an oxide containing an element in group II and an aluminum silicate salt, having a particular composition.

The inventors have also found that by optimizing the content of $Eu^{2+}$, which mainly contributes to emission, or $Eu^{2+}$ and the Ln rare earth elements, or other contained elements (for example, boron or sodium contained as a flux to facilitate the growth of grains), a blue or bluish green luminous storage material can be obtained that has very high persistence, that is structurally and chemically stable, that has high weather resistance, and that has a maximum luminescent intensity of 460 nm or near 490 nm, respectively. The inventors have confirmed that the above object can be achieved.

The aluminum silicate luminous storage material according to this invention, which has been obtained in the above manner, is a blue or bluish green luminous storage material, characterized in that its composition formula is expressed as follows:

(1)

or (2)

and in that it has been mainly activated by $Eu^{2+}$ or $Eu^{2+}$ and one or more types of rare earth elements Ln. (In the above expressions, □ is the defective composition; M is one or more types of alkali earth metal elements selected from a group of magnesium, calcium, strontium, and barium; M* is one or more types of bivalent metal elements selected from a group of manganese, zinc, and cadmium; Ln is a rare earth element other than Eu; and (n), (m), (k), and (x) are numerical values falling within the following ranges;

$0 \leq n \leq 0.2$ $0 < x < 0.6$ $0.0001 \leq m \leq 0.1$ $0.0001 \leq k \leq 0.1$)

The luminous storage material exhibits thermal luminescence when excited by ultraviolet rays and/or visible light between 220 and 480 nm followed by heating up to room temperature or a temperature region beyond it.

A method for manufacturing the blue or bluish green light-emitting aluminum silicate luminous storage material is characterized in that the luminous storage material is obtained as a powder product by burning together with sodium carbonate or boron oxide, material powders obtained by mixing a compound containing the M element, a compound containing an M* element, a compound containing an Al element, a compound containing an Si element or silicon, and a compound containing an Eu element together at the ratio expressed by the composition formula given in Expression (1), or material powders obtained by mixing the above elements and one or more types of rare earth elements Ln at the ratio expressed by Formula (2).

The burning is desirably carried out in a reducing atmosphere at 800° to 1,400° C. In addition, desirably, the material powders are molded under a load of 1 to 5,000 kg/cm$^2$ using a metal molding machine, and are then burned or calcinated to obtain a product, which is then molded under pressure using the same load and sintered.

Specifically, the aluminum silicate luminous storage material according to this invention has the host components of the luminous storage material expressed by Composition Formula (1) or (2). When the M element included in these components is partly substituted by the M* element of manganese, zinc, or cadmium, the persistence characteristic is degraded but a suitable amount of M* substitution (molar value) for improving luminance is $0 \leq n \leq 0.2$, and preferably, $0 \leq n \leq 0.05$. If the substitution factor exceeds 0.2, the effect of improved afterglows and luminance decreases significantly.

In addition, a suitable value of m that determines the composition of Eu$^{2+}$ contained in the aluminum silicate luminous storage according to this invention is $0.0001 \leq m \leq 0.1$, and preferably, $0.001 \leq m \leq 0.01$, and less than 0.0001, the amount of ions that mainly emit light is small to prevent a target luminance from being obtained. In addition, if this value exceeds 0.1, density quenching may be caused by the interaction among the luminous ions, unwanted compounds may be generated, or material oxides may remain, thereby significantly reducing the luminance of the luminous storage material obtained.

If a rare earth element Ln such as Dy$^{3+}$ or Nd$^{3+}$ is used with Eu$^{2+}$ as an activating agent, a suitable value of (k) is $0.0001 \leq k \leq 0.1$, preferably, between 0 and 50 mol % relative to Eu$^{2+}$. The resulting luminous storage material emits a bluish green light having a maximum luminescent intensity near 490 nm, in contrast to conventional strontiumaluminate, which does not contain Si.

A suitable amount of (x) (molar value) that determines the content of SiO$_2$ Or silicon included in the composition formula is $0.1 \leq x \leq 0.6$, and vacancy expressed by □ increases due to the need to maintain a charge balance as the amount of Si solved increases. Thus, preferably, a more suitable range is $0.1 \leq x \leq 0.45$; beyond 0.6, the ability to improve the persistence characteristic, and thus luminance, decreases.

When boron oxide is added as a flux to obtain powdered blue or a bluish green aluminum silicate luminous storage material having a specified grain size (1 to 10 μm), it is partly solved and substituted for Al elements to improve the persistence characteristic, but the amount of substitution does not exceed 0.001 mol. In addition, an excessive amount of boron oxide only increases the amount of materials unreacted, and does not affect the luminance or persistence characteristic despite its effect on the grain growth as a flux.

The aluminum silicate luminous storage material according to this invention exhibits thermal luminescence (fluorescence) when excited by electron beams, or ultraviolet rays and/or visible light between 220 and 480 nm followed by heating up to room temperature or a temperature beyond it.

The aluminum silicate luminous storage material according to this invention can be synthesized as follows:

The main materials of the luminous storage material comprise a compound containing the element M, an M* compound, an Al compound, a B compound, a Si element or silicon, a compound of Eu$^{2+}$ to serve as an activating agent, and a compound containing an Ln rare earth element—that is, oxides containing these elements, or salts such as carbonate, nitrate, and chloride that can be converted into oxides easily by means of sintering. These materials are weighed so as to achieve the composition range shown in Composition Formula (1) or (2) and are sufficiently wet- or dry-mixed.

The mixed powders are placed in a heat-resistant reaction container such as an aluminum or a graphite crucible directly or after they have been subjected to a pressure of 1 to 5,000 kg/cm$^2$, and are then burned once or more in a reducing atmosphere of an inert gas containing hydrogen or in a carbon reducing atmosphere, at 800° to 1,400° C. for 1 to 12 hours. When sintering is repeated twice or more, the first operation may be performed in air, but the final burning step must be executed in a reducing atmosphere.

BRIEF DESCRIPTION OF THE DRAWINGS

FIGS. 15(c) and (d) are scanning-electron-microscopic photographs shown instead of drawings and showing a crystal structure before and after burning the sample according to Comparative Example 2, respectively.

DESCRIPTION OF THE EMBODIMENTS

This invention is described below in more detail by showing embodiments and comparative examples. Theoretically, the composition formula is as shown in Formula (1) or (2), but is adjusted to the following formula according to the embodiments. In the composition, $$(M_{l-n-m}M^*_nEu_m)(Al_{1-x}Si_x)_2O_4$$

or $$(M_{l-n-m-n}M^*_nEu_mLn_k)(Al_{1-x}Si_x)_2O_4$$

the amount of silica used as a flux is ¼× greater than the amount required.

EMBODIMENT 1

To obtain an luminous storage having a chemical composition of $Sr_{0.995}$ $Eu_{0.005}$ $Al_{1.85}$ $Si_{0.15}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $SrCO_3$ | 2.938 g |
| $Al_2O_3$ | 1.886 g |
| $SiO_2$ | 0.180 g |
| $Eu_2O_3$ | 0.018 g |
| $B_2O_3$ | 0.139 g |
| $Na_2CO_3$ | 0.318 g |

The mixed powders were dried at 40° C. and molded into a disc of diameter 13 mmφ under a load of 1,000 kg/cm² using a metal molding machine, and the disc was placed in an alumina crucible and burned in argon gas containing 3% hydrogen at 1,300° C. for five hours using an electric furnace.

The sintered compact obtained was ground using a pestle and a mortar and its phase was identified using a powder X-ray diffraction method.

Figure 1:
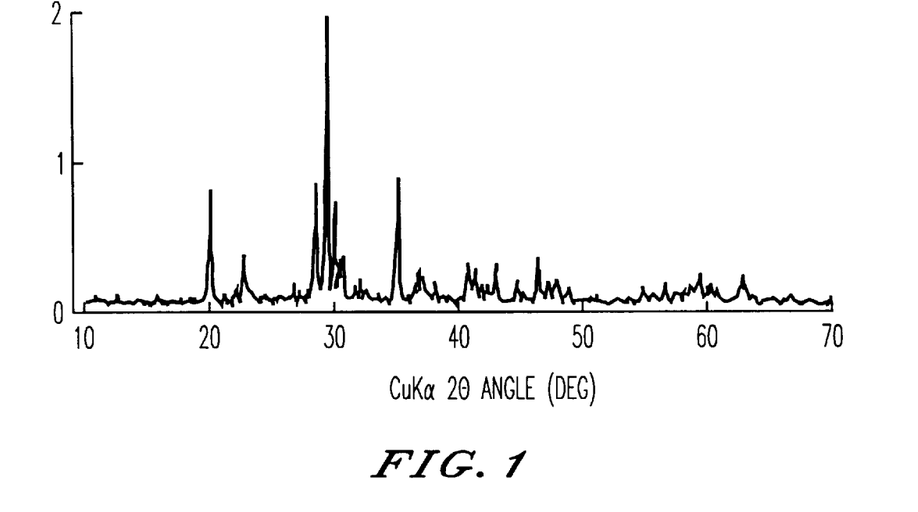
FIG. 1 is a diagram showing a powder X-ray diffraction chart of a luminous storage material having a chemical composition according to Embodiment 1.
Figure 2:
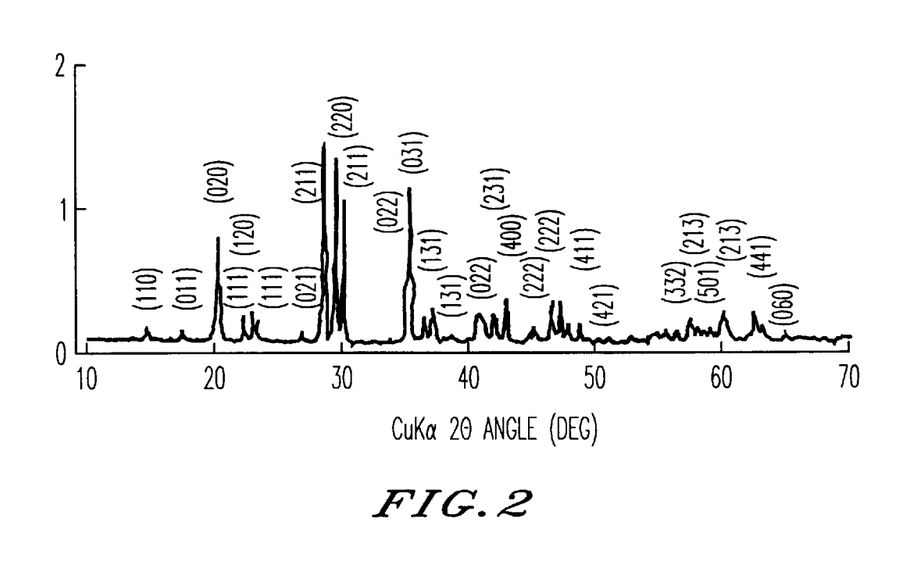
FIG. 2 is a diagram showing a powder X-ray diffraction chart of SrAl$_2$O$_4$ for comparison.

FIG. 1 shows the results of powder X-ray diffraction using CuKα rays. For comparison, FIG. 2 shows a powder X-ray diffraction chart of $SrAl_2O_4$ synthesized. As shown in the figure, each peak is indexed and belongs to a monoclinic stuffed tridymite structure. These results show that the sample obtained according to this embodiment had almost a single phase and was isomorphous with $SrAl_2O_4$.

Figure 3:
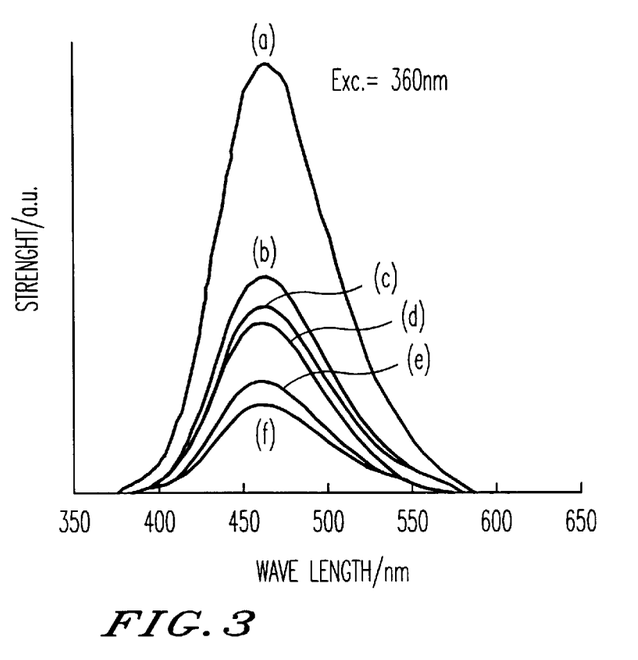
FIG. 3 is a diagram showing as (a) to (f) emission spectra (excitation: 360 nm) of a luminous storage material according to Embodiments 1 to 6 of this invention.
Figure 4:
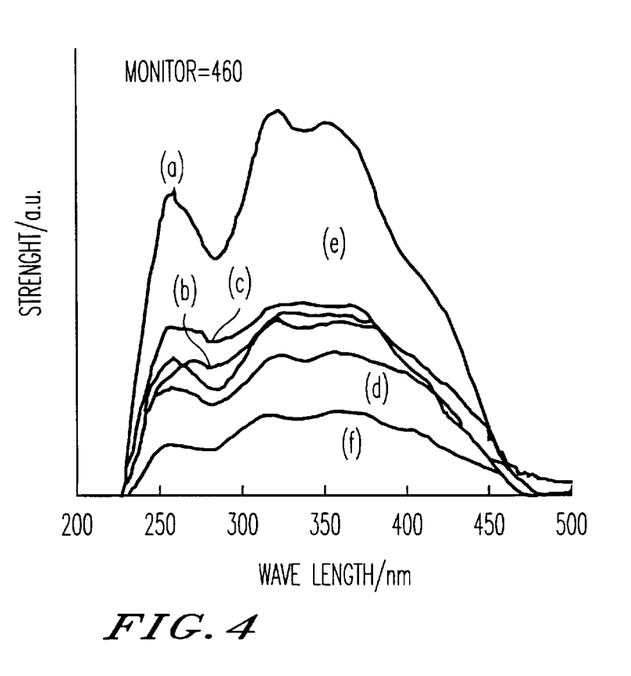
FIG. 4 is a diagram showing as (a) to (f) excitation spectra emission: 460 nm) according to Embodiments 1 to 6 of this invention.

FIG. 3(a) shows an emission spectrum of a sample according to Embodiment 1 when it was excited by 360-nm ultraviolet rays. This figure shows that the peak that provided a maximum luminescent intensity was a blue light emission located near 460 nm. In addition, FIG. 4(a) shows an excitation spectrum.

Then, the sample was excited at an excitation wavelength of 250 nm for 30 seconds, and temporal changes in the luminescent intensity of a 460-nm peak (persistence characteristic) were then measured.

Figure 5:
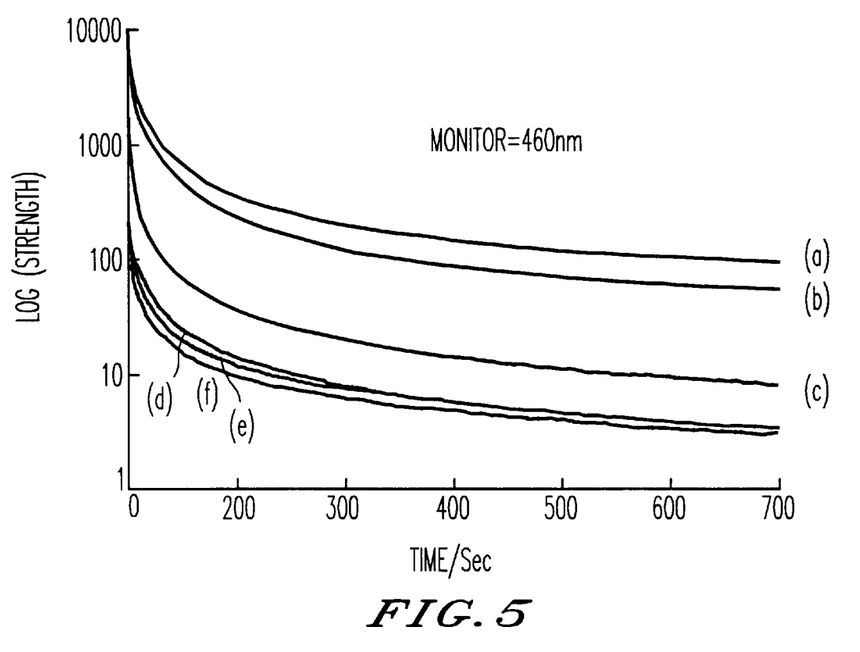
FIG. 5 is a diagram showing as (a) to (f) temporal changes in luminescent intensity (persistence characteristic) according to Embodiments 1 to 6 of this invention.

FIG. 5(a) shows the results of the measurement. In addition, $BaSO_4$ was absorbed and measured as a reference sample using diffusion reflection method.

Figure 6:
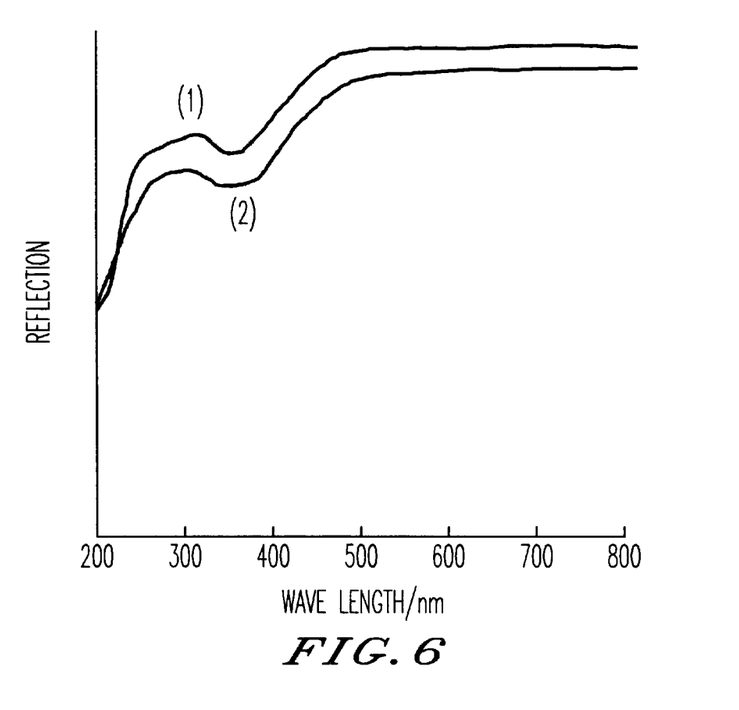
FIG. 6 is a diagram showing as (1) and (2) diffuse reflection spectra according to Embodiment 1 and Comparative Example 1.

FIG. 6 (1) shows a diffuse reflection spectrum. This figure shows that this spectrum has the same profile as the diffuse reflection spectrum (shown in FIG. 6 (2)) of a sample containing no Si and obtained in Comparative Example 1, which is described below. Thus, the absorbing end of each sample can be assumed to be located in a region of wavelength smaller than 200 nm.

EMBODIMENT 2

To obtain luminous storage having a chemical composition of $Sr_{0.99}$ $Zn_{0.005}$ $Eu_{0.005}$ $Al_{1.85}$ $Si_{0.15}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $SrCO_3$ | 2.923 g |
| ZnO | 0.008 g |
| $Al_2O_3$ | 1.886 g |
| Silicon | 0.084 g |
| $Eu_2O_3$ | 0.018 g |
| $B_2O_3$ | 0.014 g |
| $Na_2CO_3$ | 0.518 g |

The mixed powders were dried at 40° C. and molded into a disc of diameter 13 mmφ under a load of 1,500 kg/cm² using a metal molding machine, and the disc was placed in an alumina crucible and burned in argon gas containing 3% hydrogen at 1,300° C for three hours using an electric furnace. The sintered compact obtained was ground to obtain luminous storage material according to this invention that emits a blue light.

Figure 7:
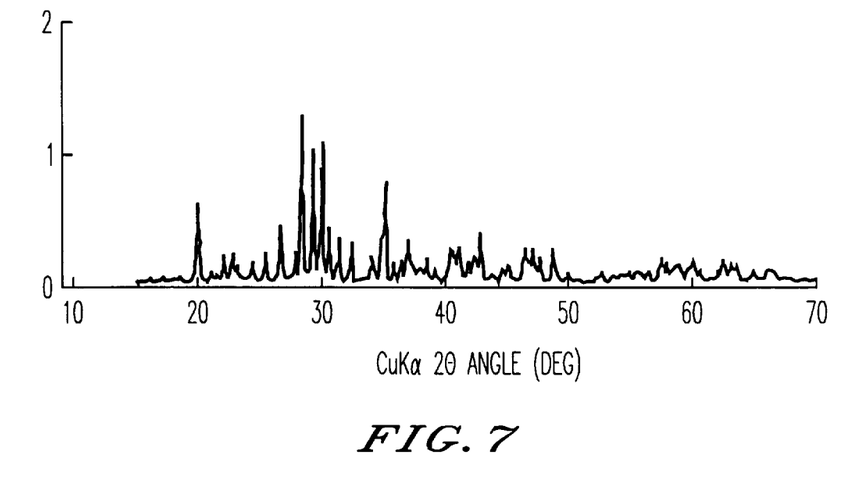
FIG. 7 is a diagram showing a powder X-ray diffraction chart of a luminous storage material having a chemical composition according to Embodiment 2.

This luminous storage material was obtained by substituting $Sr_{0.99}$ $Zn_{0.005}$ for $Sr_{0.995}$ in the sample of the chemical composition shown in Embodiment 1. FIG. 7 shows a powder X-ray diffraction chart of the sample obtained wherein CuKα rays were used. As in Embodiment 1, the figure shows that the sample obtained according to this embodiment had almost a single phase and was isomorphous with $SrAl_2O_4$.

FIG. 3(b) shows an emission spectrum of the sample when its was excited by 360-nm ultraviolet rays. This figure shows that the peak that provided a maximum luminescent intensity was a blue light emission located near 460 nm. In addition, FIG. 4(b) shows an excitation spectrum.

Then, the sample was excited at an excitation wavelength of 250 nm for 30 seconds, and temporal changes in the luminescent intensity of a 460-nm peak (persistence characteristic) were then measured. FIG. 5(b) shows the results of the measurement.

EMBODIMENT 3

To obtain luminous storage material having a chemical composition of $Ca_{0.95}$ $Eu_{0.05}$ $Al_{1.80}$ $Si_{0.20}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $CaCO_3$ | 1.902 g |
| $Al_2O_3$ | 1.836 g |
| $SiO_2$ | 0.240 g |
| $Eu_2O_3$ | 0.176 g |
| $B_2O_3$ | 0.069 g |
| $Na_2CO_3$ | 0.318 g |

The mixed powders were dried at 40° C. and molded into a disc of diameter 13 mmφ under a load of 2,000 kg/cm² using a metal molding machine, and the disc was placed in an alumina crucible and burned in argon gas containing 3% hydrogen at 1,350° C. for three hours using an electric furnace. The sintered compact obtained was ground to obtain a luminous storage material according to this invention having a blue light emission.

This luminous storage material was obtained by substituting $Ca_{0.95}$ for $Sr_{0.995}$ in the sample of the chemical composition shown in Embodiment 1. and increasing the content of Eu from 0.005 to 0.05.

FIG. 3(c) shows an emission spectrum of the sample when it was excited by 360-nm ultraviolet rays. This figure shows that the peak that provided a maximum luminescent intensity was the emission of a blue light emission near 460 nm. In addition, FIG. 4(c) shows an excitation spectrum.

Then, the sample was excited at an excitation wavelength of 250 nm for 30 seconds, and temporal changes in the luminescent intensity of a 460-nm peak (persistence characteristic) were then measured. FIG. 5(c) shows the results of the measurement.

EMBODIMENT 4

To obtain an luminous storage material having a chemical composition of $Ca_{0.79}$ $Ba_{0.20}$ $Eu_{0.01}$ $Al_{1.80}$ $Si_{0.20}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $BaCO_3$ | 0.789 g |
| $CaCO_3$ | 1.581 g |
| $Al_2O_3$ | 1.836 g |
| $SiO_2$ | 0.240 g |
| $Eu_2O_3$ | 0.035 g |
| $B_2O_3$ | 0.069 g |
| $Na_2CO_3$ | 0.318 g |

The mixed powders were dried at 40° C. and molded into a disc of diameter 13 mmφ under a load of 1,000 kg/cm² using a metal molding machine, and the disc was placed in a graphite crucible and burned in argon gas containing 3% hydrogen at 1,250° C. for five hours using an electric furnace. The sintered compact obtained was ground to obtain a luminous storage material according to this invention that emits a blue light.

This luminous storage material was obtained by substituting $Ca_{0.79}$ $Ba_{0.20}$ for $Sr_{0.995}$ in the sample of the chemical composition shown in Embodiment 1, and increasing the content of Eu from 0.005 to 0.01.

FIG. 3(d) shows an emission spectrum of the sample when it was excited by 360-nm ultraviolet rays. This figure shows that the peak that provided a maximum luminescent intensity was a blue light emission located near 460 nm. In addition, FIG. 4(d) shows an excitation spectrum.

Then, the sample was excited at an excitation wavelength of 250 nm for 30 seconds, and temporal changes in the luminescent intensity of a 460-nm peak (persistence characteristic) were then measured. FIG. 5(d) shows the results of the measurement.

EMBODIMENT 5

To obtain an luminous storage material having a chemical composition of $Ba_{0.98}$ $Eu_{0.02}$ $Al_{1.90}$ $Si_{0.10}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $BaCO_3$ | 3.868 g |
| $Al_2O_3$ | 1.938 g |
| $SiO_2$ | 0.120 g |
| $Eu_2O_3$ | 0.070 g |
| $B_2O_3$ | 0.069 g |
| $Na_2CO_3$ | 0.415 g |

The mixed powders were dried at 40° C. and molded into a disc of diameter 13 mmφ under a load of 1,000 kg/cm² using a metal molding machine, and the disc was placed in an alumina crucible and burned in argon gas containing 3% hydrogen at 1,350° C. for four hours using an electric furnace. The sintered compact obtained was ground to obtain a luminous material storage according to this invention having a blue light emission.

This luminous storage material was obtained by substituting $Ba_{0.98}$ for $Sr_{0.995}$ in the sample of the chemical composition shown in Embodiment 1, and increasing the content of Eu from 0.005 to 0.02.

FIG. 3(e) shows an emission spectrum of the sample when it was excited by 360-nm ultraviolet rays. This figure shows that the peak that provided a maximum luminescent intensity was a blue light emission located near 460 nm. In addition, FIG. 4(e) shows an excitation spectrum.

Then, the sample was excited at an excitation wavelength of 250 nm for 30 seconds, and temporal changes in the luminescent intensity of a 460-nm peak (persistence characteristic) were then measured. FIG. 5(e) shows the results of the measurement.

EMBODIMENT 6

To obtain a luminous storage material having a chemical composition of $Mg_{0.799}$ $Ba_{0.20}$ $Eu_{0.001}$ $Al_{1.90}$ $Si_{0.10}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| MgO | 0.644 g |
| $BaCO_3$ | 0.789 g |
| $Al_2O_3$ | 1.938 g |
| $SiO_2$ | 0.120 g |
| $Eu_2O_3$ | 0.007 g |
| $B_2O_3$ | 0.069 g |
| $Na_2CO_3$ | 0.415 g |

The mixed powders were dried at 40° C and molded into a disc of diameter 13 mmφ under a load of 1,000 kg/cm² using a metal molding machine, and the disc was placed in an alumina crucible and burned in argon gas containing 3% hydrogen at 1,350° C. for three hours using an electric furnace.

This luminous storage material was obtained by substituting $Mg_{0.799}$ $Ba_{0.20}$ for $Ba_{0.98}$ in the sample of the chemical composition shown in Embodiment 5. and reducing the content of Eu from 0.02 to 0.001.

FIG. 3(f) shows an emission spectrum of the sample when it was excited by 360-nm ultraviolet rays. This figure shows that the peak that provided a maximum luminescent intensity was a blue light emission located near 460 nm. In addition, FIG. 4(f) shows an excitation spectrum.

Then, the sample was excited at an excitation wavelength of 250 nm for 30 seconds, and temporal changes in the luminescent intensity of a 460-nm peak (persistence characteristic) were then measured. FIG. 5(f) shows the results of the measurement.

EMBODIMENT 7

To obtain a luminous storage material having a chemical composition of $Sr_{0.9925}$ $Eu_{0.005}$ $Dy_{0.0025}$ $Al_{1.80}$ $Si_{0.20}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $SrCO_3$ | 2.930 g |
| $Al_2O_3$ | 1.836 g |
| $SiO_2$ | 0.240 g |
| $Eu_2O_3$ | 0.018 g |
| $Dy_2O_3$ | 0.009 g |
| $B_2O_3$ | 0.139 g |
| $Na_2CO_3$ | 0.318 g |

The mixed powders were dried at 40° C. and molded into a disc of diameter 13 mmφ under a load of 1,000 kg/cm² using a metal molding machine, and the disc was placed in an alumina crucible and burned in argon gas containing 3% hydrogen at 1,300° C. for three hours using an electric furnace.

Figure 8:
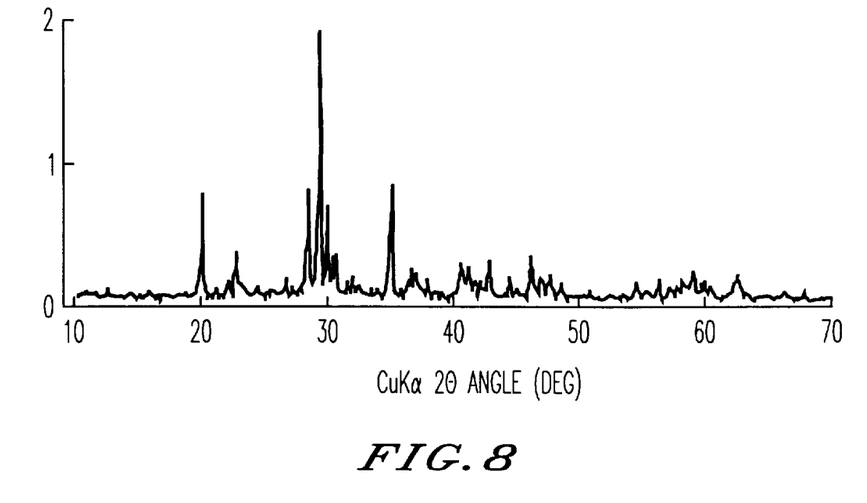
FIG. 8 is a diagram showing a powder X-ray diffraction chart of a phosphor having a chemical composition according to Embodiment 7.

This luminous storage was obtained by substituting $Sr_{0.9925}$ $Eu_{0.005}$ $Dy_{0.0025}$ for $Ca_{0.95}$ $Eu_{0.05}$ in the sample of the chemical composition shown in Embodiment 3. FIG. 8 shows a powder X-ray diffraction chart of the sample obtained wherein CuKα rays were used. As in Embodiment 1, the figure shows that the sample obtained according to this embodiment had almost a single phase and was isomorphous with $SrAl_2O_4$.

Figure 9:
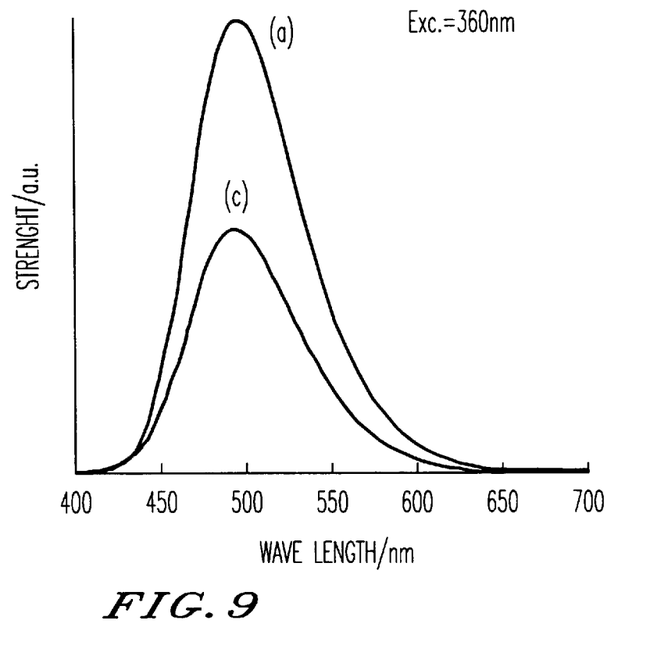
FIG. 9 is a diagram showing as (a) and (c) emission spectra (excitation: 360 nm) of samples according to Embodiments 7 and 8.
Figure 11:
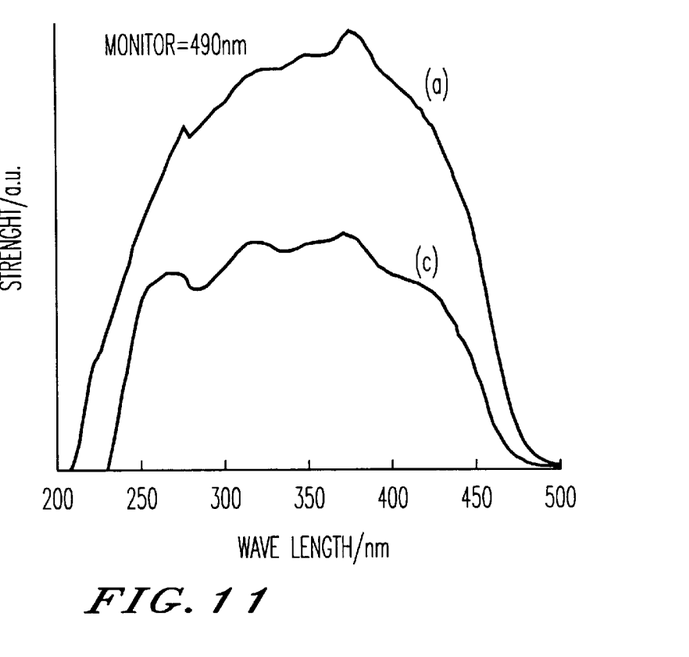
FIG. 11 is a diagram showing as (a) and (c) emission spectra (excitation: 490 nm) of samples according to Embodiments 7 and 8.

FIG. 9(a) shows an emission spectrum of the sample when it was excited by 360-nm ultraviolet rays. This figure shows that the peak that provided a maximum luminescent intensity was a blue light emission located near 490 nm, in contrast to the peaks in the previous embodiments. In addition, FIG. 11(a) shows an excitation spectrum.

Figure 13:
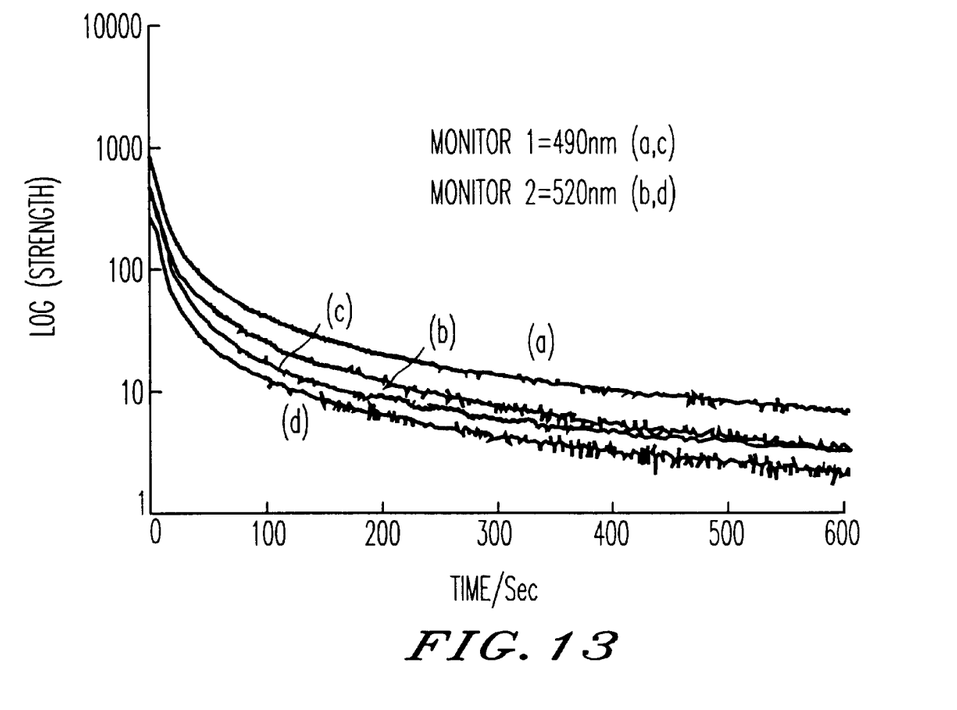
FIG. 13 is a diagram showing as (a)–(d) temporal changes in the luminescent intensity of samples according to Embodiment 7, Comparative Example 2, Embodiment 8, and Comparative Example 1.

Then, the sample was excited at an excitation wavelength of 250 nm for 30 seconds, and temporal changes in the luminescent intensity of a 460-nm peak (persistence characteristic) were then measured. FIG. 13(a) shows the results of the measurement. This figure indicates that activation with both Eu and Dy provides a bluish green luminous storage material instead of a blue luminous aluminum silicate storage material.

EMBODIMENT 8

To obtain a luminous storage material having a chemical composition of $Sr_{0.9925}$ $Eu_{0.005}$ $Nd_{0.0025}$ $Al_{1.80}$ $Si_{0.20}$ $O_4$, $B_2O_3$ and $Na_2CO_3$ were added as fluxes and the following amounts of material powders were each weighed. Then, an appropriate amount of alcohol was added and these materials were sufficiently wet-mixed in a ball mill for 24 hours.

| | |
|---|---|
| $SrCO_3$ | 2.930 g |
| $Al_2O_3$ | 1.836 g |
| $SiO_2$ | 0.240 g |
| $Eu_2O_3$ | 0.018 g |
| $Nd_2O_3$ | 0.008 g |
| $B_2O_3$ | 0.139 g |
| $Na_2CO_3$ | 0.318 g |

The mixed powders were dried at 40° C. and molded into a disc of diameter 13 mmφ under a load of 1,000 kg/cm² using a metal molding machine, and the disc was placed in a graphite crucible and burned in argon gas containing 3% hydrogen at 1,250° C. for three hours using an electric furnace.

This luminous storage material was obtained by substituting $Nd_{0.0025}$ for $Dy_{0.0025}$ in the sample of the chemical composition shown in Embodiment 2. A powder X-ray diffraction chart of the sample obtained shows that the sample had almost a single phase and was isomorphous with $SrAl_2O_4$, just as in Embodiment 1.

FIG. 9(c) shows an emission spectrum of the sample when it was excited by 360-nm ultraviolet rays. This figure shows that the peak that provided a maximum luminescent intensity was a blue light emission located near 490 nm, as in Embodiment 6. In addition, FIG. 11(c) shows an excitation spectrum.

Then, the sample was excited at an excitation wavelength of 250 nm for 30 seconds, and temporal changes in the luminescent intensity of a 490-nm peak (persistence characteristic) were then measured. FIG. 13(c) shows the results of the measurement. This figure indicates that activation with both Eu and Dy provides a bluish green luminous storage material, just as in Embodiment 6.

EMBODIMENT 9

The luminous storage material having the chemical composition $Sr_{0.9925}$ $Eu_{0.005}$ $Dy_{0.0025}$ $Al_{1.80}$ $Si_{0.20}$ $O_4$ was placed in an alumina crucible and burned in air at 850° C. for six hours using an electric furnace. For comparison, material powders corresponding to the chemical formula $Sr_{0.9925}$ $Eu_{0.005}$ $DY_{0.0025}$ $Al_2$ $O_4$ containing no Si were placed in an alumina crucible and burned in argon gas containing 3% hydrogen at 1,300° C. for three hours using an electric furnace. The sample obtained was then burned in the same conditions as described above, that is, in the air at 850° C for six hours.

Figure 14A:
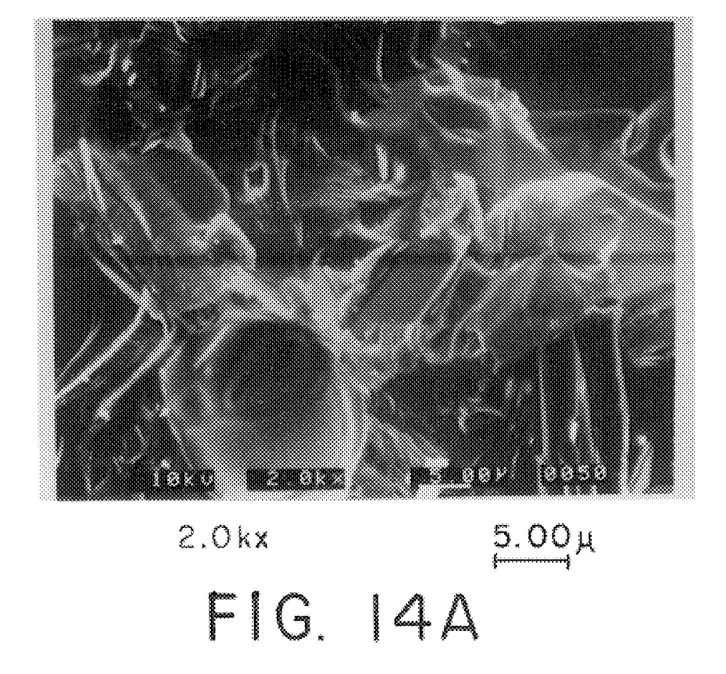
FIGS. 14(a) and (b) are scanning-electron-microscopic photographs shown instead of drawings and showing a crystal structure before and after burning the sample according to Embodiment 7, respectively.

This luminous storage material was confirmed to be a bluish green emission isomorphous with $SrAl_2O_4$ and located near 490 nm both before and after burning at 850° C., as shown in Embodiment 7. FIGS. 14(a) and (b) show scanning-electron-microscopic (SEM) photographs of a broken-out section of the sample of $Sr_{0.9925}$ $Eu_{0.005}$ $DY_{0.0025}$ $Al_{1.80}$ $Si_{0.20}$ $O_4$ before and after burning, and FIGS. 15(a) and (b) show scanning-electron-microscopic (SEM) photographs of a broken-out section of the sample of $Sr_{0.9925}$ $Eu_{0.005}$ $Dy_{0.025}$ $Al_2$ $O_4$ before and after burning.

Figure 15A:
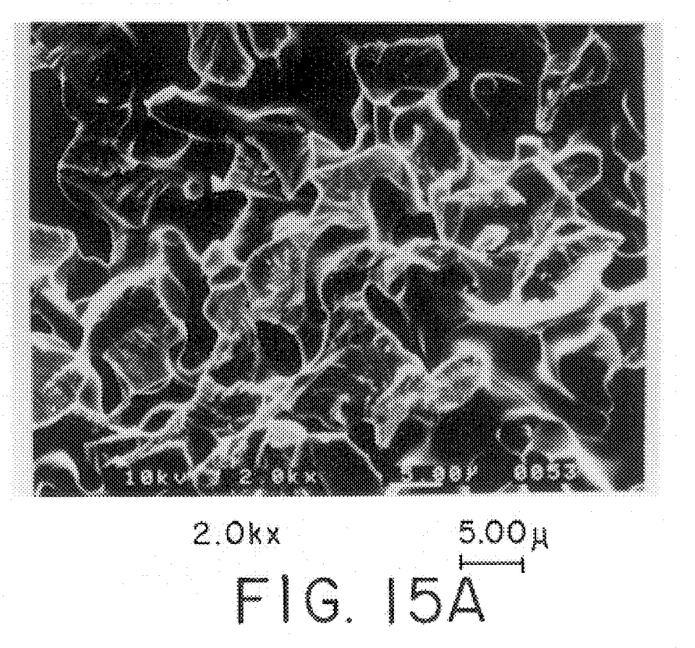
Figure 15B:
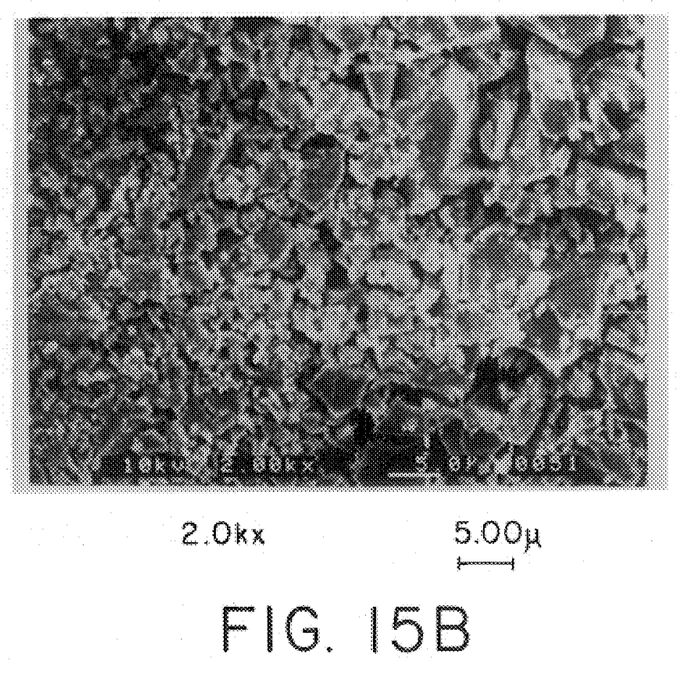

FIGS. 14(a) and 15(a) are both photographs of the broken-out sections of the samples prior to burning at 850° C. This figure shows that the crystal grains in the sample containing Si had grown bigger than those in the sample containing no Si and that a glass phase was formed in the grain boundary of the sample containing Si. This is because both $Ba_2O_3$ and $Na_2CO_3$, which were used as fluxes, reacted with silica to generate the glass phase.

Figure 14B:
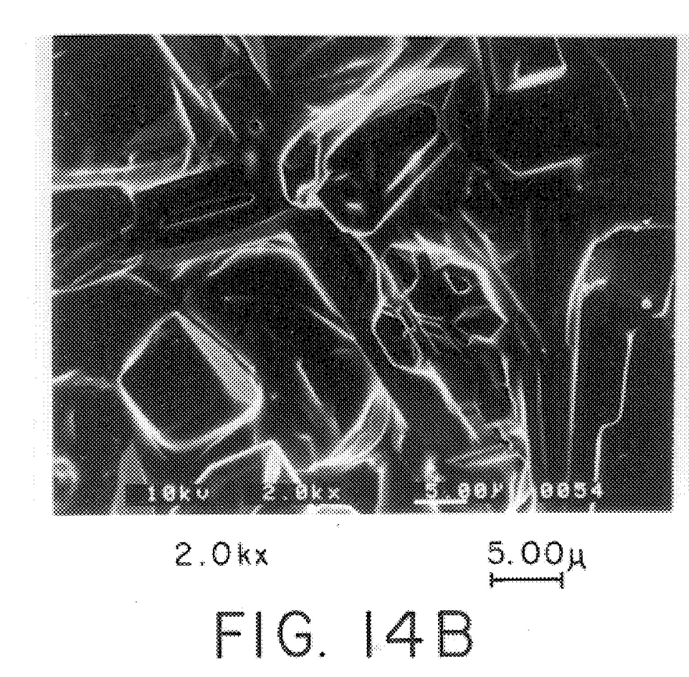

FIGS. 14(b) and 15(b) are both photographs of the broken-out sections of the samples after burning at 850° C. These figures show that the sample containing Si consisted of grains of almost the same size which were combined together via a glass phase.

In addition, the luminance of a bluish green light emission located near 490 nm was confirmed to remain unchanged after burning at 850° C. In the sample containing Si, the surfaces of the grains were observed to have been thermally etched by the burning at 850° C. Furthermore, the results of powder X-ray diffraction showed few yellowish green light emissions despite the absence of structural changes.

These results indicate that the sample containing Si is thermally stable.

Furthermore, unlike the sample containing Si, the sample containing no Si has been found to be corroded easily by phosphoric acid or dilute hydrochloric acid, thus becoming porous. In addition, the emission characteristic of the sample without Si was also significantly degraded.

Comparative Example 1

As Comparative Example 1, an $SrAl_2O_4$ luminous storage material having a chemical composition $Sr_{0.995}Eu_{0.005}Al_2O_4$ was produced using $Eu^{2+}$ for activation. $B_2O_3$ and $Na_2CO_3$ were added as fluxes and the following amounts of material powders were each weighed. An appropriate amount of alcohol was added and these materials were then sufficiently wet-mixed in a ball mill for 24 hours.

| | |
|---|---|
| $SrCO_3$ | 2.938 g |
| $Al_2O_3$ | 2.040 g |
| $Eu_2O_3$ | 0.018 g |
| $B_2O_3$ | 0.139 g |
| $Na_2CO_3$ | 0.318 g |

The mixed powders were dried at 40° C. and molded into a disc of diameter 13 mmφ under a load of 1,000 kg/cm² using a metal molding machine, and the disc was mmφ under a load of 1,000 kg/cm² using a metal molding machine, and the disc was placed in an alumina crucible and burned in argon gas containing 3% hydrogen at 1,300° C. for six hours using an electric furnace.

Figure 10:
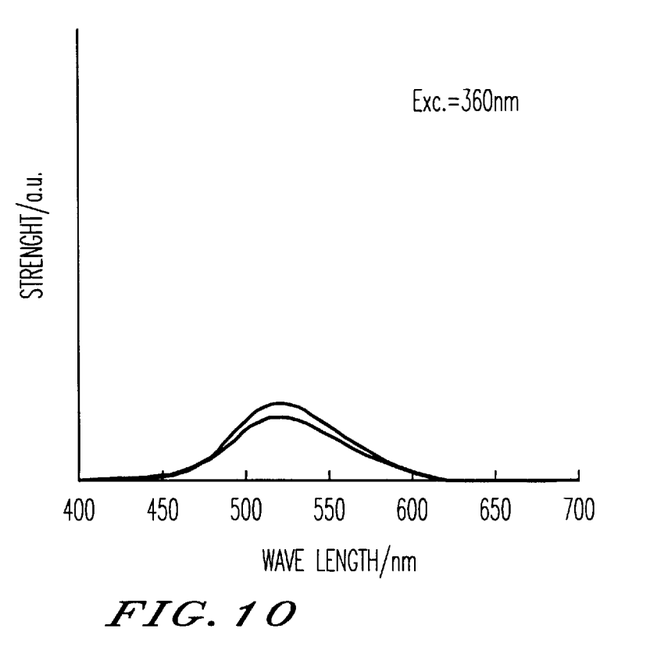
FIG. 10 is a diagram showing as (b) and (d) emission spectra (excitation: 360 nm) of samples according to Comparative Examples 2 and 1.
Figure 12:
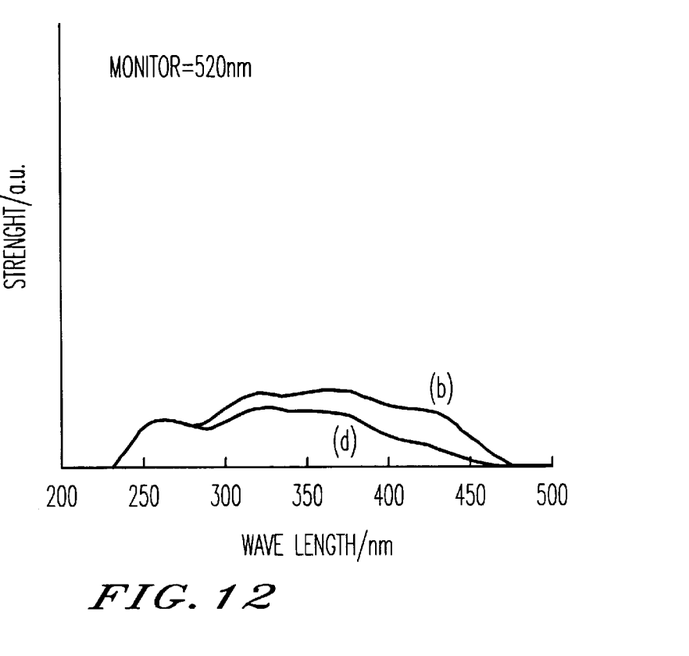
FIG. 12 is a diagram showing as (b) and (d) excitation spectra emission: 520 nm) of samples according to Comparative Examples 2 and 1.

FIG. 10(d) shows an emission spectrum of the sample when excited by 360-nm ultraviolet rays, and FIG. 12(d) shows an excitation spectrum. FIG. 13(d) shows temporal changes in the luminescent intensity of a yellowish-green peak (persistence characteristic). FIG. 6 (2) shows a diffuse reflection spectrum.

Comparative Example 2

As Comparative Example 2, an $SrAl_2O_4$ luminous storage material of a chemical composition $Sr_{0.9925}Eu_{0.005}Dy_{0.0025}Al_2O_4$ was produced using both $Eu^{2+}$ and $Dy^{3+}$ for activation. $B_2O_3$ and $Na_2CO_3$ were added as fluxes and the following amounts of material powders were each weighed. An appropriate amount of alcohol was added and these materials were then sufficiently wet-mixed in a ball mill for 24 hours.

| | |
|---|---|
| $SrCO_3$ | 2.930 g |
| $Al_2O_3$ | 2.040 g |
| $Eu_2O_3$ | 0.018 g |
| $Dy_2O_3$ | 0.009 g |
| $B_2O_3$ | 0.139 g |
| $Na_2CO_3$ | 0.318 g |

The mixed powders were dried at 40° C and molded into a disc of diameter 13 mmφ under a load of 1,000 kg/cm² using a metal molding machine, and the disc was placed in an alumina crucible and burned in argon gas containing 3% hydrogen at 1,250° C. for four hours using an electric furnace.

FIG. 10(b) shows an emission spectrum of the sample when excited by 360-nm ultraviolet rays, and FIG. 12(b) shows an excitation spectrum. FIG. 13(b) shows temporal changes in the luminescent intensity of a yellowish-green peak (persistence characteristic).

As described above in detail, the aluminum silicate compound, which is a new compound according to this invention and which has a composition expressed by Formula (1), is a blue luminous material having a maximum luminescent intensity at 460 nm. In addition, the aluminum silicate compound having the composition expressed by Formula (2) is a bluish green luminous material having a maximum luminescent intensity at 490 nm. It is clear that these compounds have a persistence characteristic that is similar to or higher than that of the strontiumaluminate luminous storage material shown in the comparative examples.

In addition, as shown in Embodiment 9, the present luminous storage material is thermally or chemically stable and has a high weather resistance. The luminance or persistence characteristic of this luminous storage material is unlikely to be degraded, so it can be sufficiently used in severe conditions involving high temperatures and high moisture or in a solution containing acid.

What is claimed is:

1. A blue aluminum silicate luminous storage material that has been activated by $Eu^{2+}$, wherein its composition formula is expressed as follows:

$(M_{l-n-m}M^*{}_nEu_m)(Al_{1-x}Si_{3/4}x\square_{1/4x})_2O_4$

(wherein □ is vacancy; M is one or more types of alkali earth metal elements selected from a group of magnesium, calcium, strontium, and barium; M* is one or more types of bivalent metal elements selected from a group of manganese, zinc, and cadmium; and (n), (m), and (x) consist of values falling within the following ranges:

$0 \leq n \leq 0.2$ $0 < x < 0.6$ $0.0001 \leq m \leq 0.1$).

2. A bluish green aluminum silicate luminous storage material that has been activated by $Eu^{2+}$ and one or more types of rare earth elements Ln, wherein its composition formula is expressed as follows:

$(M_{l-n-m}M^*{}_nEu_mLn_k)(Al_{1-x}Si_{3/4}x\square_{1/4x})_2O_4$ (wherein □ is vacancy; M is one or more types of alkali earth metal elements selected from a group of magnesium, calcium, strontium, and barium; M* is one or more types of bivalent metal elements selected from a group of manganese, zinc, and cadmium; Ln designates a rare earth element other than Eu; and (n), (m), (k), and (x) consist of values falling within the following ranges:

$0 \leq n \leq 0.2$ $0 \leq x \leq 0.6$ $0.0001 \leq m \leq 0.1$ $0.0001 \leq k \leq 0.1$).

3. An aluminum silicate luminous storage material according to claim 1 or 2 wherein the molar value (n) of M* in the composition formula is $0 \leq n \leq 0.05$.

4. An aluminum silicate luminous storage material according to claim 1 or 2 wherein the molar value (m) of $Eu^{2+}$ in the composition formula is $0.001 \leq m \leq 0.01$.

5. An aluminum silicate luminous storage material according to claim 1 or 2 wherein the molar value (x) of silicon in the composition formula is $0.1 \leq x \leq 0.45$.

6. An aluminum silicate luminous storage material according to claim 2 wherein the molar value (k) of $Dy^{3+}$ or $Nd^{3+}$, which are used as the rare earth element Ln to provide an activating agent, is 1 to 50 mol % relative to $Eu^{2+}$.

7. A blue aluminum silicate luminous storage manufacturing method wherein a compound containing an M element, a compound containing an M* element, a compound containing an Al element, a compound containing an Si element or silicon, and a compound containing an Eu element, all the elements being included in the following composition formula:

$$(M_{l-n-m}M^*_nEu_m)(Al_{1-x}Si_{3/4}x\square_{1/4x})_2O_4$$

(wherein $\square$ is vacancy; M is one or more types of alkali earth metal elements selected from a group of magnesium, calcium, strontium, and barium; M* is one or more types of bivalent metal elements selected from a group of manganese, zinc, and cadmium; and (n), (m), and (x) consist of values falling within the following ranges:

$0 \leq n \leq 0.2$ $0 < x < 0.6$ $0.0001 \leq m \leq 0.1$)

are mixed at the ratio in the composition formula, wherein the material powders obtained are burned with sodium carbonate or boron oxide to obtain a luminous storage material according to claim 1 as a powdered product.

8. A bluish green aluminum silicate luminous storage material manufacturing method wherein a compound containing an M element, a compound containing an M* element, a compound containing an Al element, a compound containing an Si element or silicon, and a compound containing an Eu element, all the elements being included in the following composition formula:

$$(M_{l-n-m-k}M^*_nEu_mLn_k)(Al_{1-x}Si_{3/4}x\square_{1/4x})_2O_2$$

(wherein $\square$ is vacancy; M is one or more types of alkali earth metal elements selected from a group of magnesium, calcium, strontium, and barium; M* is one or more types of bivalent metal elements selected from a group of manganese, zinc, and cadmium; Ln designates a rare earth element other than Eu; and (n), (m), (k), and (x) consist of values falling within the following ranges:

$0 \leq n \leq 0.2$ $0 < x < 0.6$ $0.0001 \leq m \leq 0.1$ $0.0001 \leq k \leq 0.1$)

are mixed at the ratio in the composition formula, wherein the material powders obtained are burned with sodium carbonate or boron oxide to obtain the luminous storage according to claim 2 as a powdered product.

9. A luminous storage manufacturing method according to claim 7 or 8 wherein burning is carried out in a reducing atmosphere at 800° to 1,400° C.

10. A luminous storage manufacturing method according to claim 7 or 8 wherein the material powders are molded under a load of 1 to 5,000 kg/cm² using a molding machine and are burned or calcinated to obtain a product, which is then molded under the same load and sintered.

11. A luminous storage manufacturing method according to claim 7 or 8 wherein boron oxide is added as a flux.

* * * * *